United States Patent
Chauvin et al.

(10) Patent No.: US 10,011,066 B2
(45) Date of Patent: Jul. 3, 2018

(54) APPARATUS AND METHOD FOR FABRICATING CONTAINERS

(71) Applicant: DISCMA AG, Zürich (CH)

(72) Inventors: Guillaume Chauvin, Duchess Manor (SG); Klaus Hartwig, Nancy (FR); Damien Kannengiesser, Golbey (FR)

(73) Assignee: DISCMA AG, Zürich (CH)

( * ) Notice: Subject to any disclaimer, the term of this patent is extended or adjusted under 35 U.S.C. 154(b) by 240 days.

(21) Appl. No.: 14/652,861

(22) PCT Filed: Dec. 5, 2013

(86) PCT No.: PCT/EP2013/075632
§ 371 (c)(1),
(2) Date: Jun. 17, 2015

(87) PCT Pub. No.: WO2014/095386
PCT Pub. Date: Jun. 26, 2014

(65) Prior Publication Data
US 2015/0328821 A1 Nov. 19, 2015

(30) Foreign Application Priority Data
Dec. 19, 2012 (EP) .................................... 12198191

(51) Int. Cl.
*B29C 49/46* (2006.01)
*B29C 49/36* (2006.01)
(Continued)

(52) U.S. Cl.
CPC .............. *B29C 49/36* (2013.01); *B29C 33/72* (2013.01); *B29C 49/12* (2013.01); *B29C 49/38* (2013.01);
(Continued)

(58) Field of Classification Search
CPC ...... B29C 2049/465; B29C 2049/4652; B29C 2049/4655; B29C 2049/4658; B29C 2049/4644
See application file for complete search history.

(56) References Cited

U.S. PATENT DOCUMENTS

| 4,035,463 A | 7/1977 | Rosenkranz et al. |
| 2006/0097417 A1* | 5/2006 | Emmer ............... B29C 49/0042 264/40.1 |

(Continued)

FOREIGN PATENT DOCUMENTS

| EP | 0423405 A1 | 4/1991 |
| EP | 1226017 A1 | 7/2002 |
| JP | H0263720 A | 3/1990 |

*Primary Examiner* — Timothy Kennedy
(74) *Attorney, Agent, or Firm* — Eric J. Sosenko; Jonathan P. O'Brien; Honigman Miller Schwartz and Cohn LLP

(57) ABSTRACT

An apparatus (500) for fabricating containers (511) comprises a plurality of mold segments (501A-501I) each with two substantially opposite faces (510A-510I) that form a mold cavity (509A-509I) when abutted against another mold segment (501A-501I), and a guiding means (502) to conduct them along a closed path (503) of length greater than the total length of the mold segments (501A-501I); being characterized in that it comprises at least one injecting head configured to inject a volume of liquid into a cavity of a preform (507) disposed within the mold cavity (509A-509I) and expand it into a container (511), and being further characterized in that each mold segment (501A-501I) is conducted along the closed path (503) through at least one manipulation zone (505, 506) of said closed path (503) at an increased speed relative to the immediately adjacent mold segments (501A-501I), said apparatus (500) comprising a positioning manipulation zone (505) where the preform (507) is inserted into said apparatus (500), and an extracting (Continued)

manipulation zone (506) where the container (511) is extracted.

9 Claims, 5 Drawing Sheets

(51) Int. Cl.

| | | |
|---|---|---|
| B29C 33/72 | (2006.01) | |
| B29C 49/12 | (2006.01) | |
| B29C 49/42 | (2006.01) | |
| B29C 49/38 | (2006.01) | |
| B29C 49/56 | (2006.01) | |
| B29C 49/70 | (2006.01) | |
| B29K 105/00 | (2006.01) | |
| B29L 31/00 | (2006.01) | |
| B29C 49/06 | (2006.01) | |

(52) U.S. Cl.
CPC .......... *B29C 49/42* (2013.01); *B29C 49/4273* (2013.01); *B29C 49/46* (2013.01); *B29C 49/56* (2013.01); *B29C 49/70* (2013.01); *B29C 49/06* (2013.01); *B29C 2049/465* (2013.01); *B29K 2105/258* (2013.01); *B29L 2031/7158* (2013.01)

(56) References Cited

U.S. PATENT DOCUMENTS

| | | | |
|---|---|---|---|
| 2008/0029928 A1* | 2/2008 | Andison | B29C 49/46 264/238 |
| 2011/0265433 A1* | 11/2011 | Chauvin | B29C 49/46 53/558 |
| 2013/0015610 A1* | 1/2013 | Seger | B29C 49/4205 264/523 |

* cited by examiner

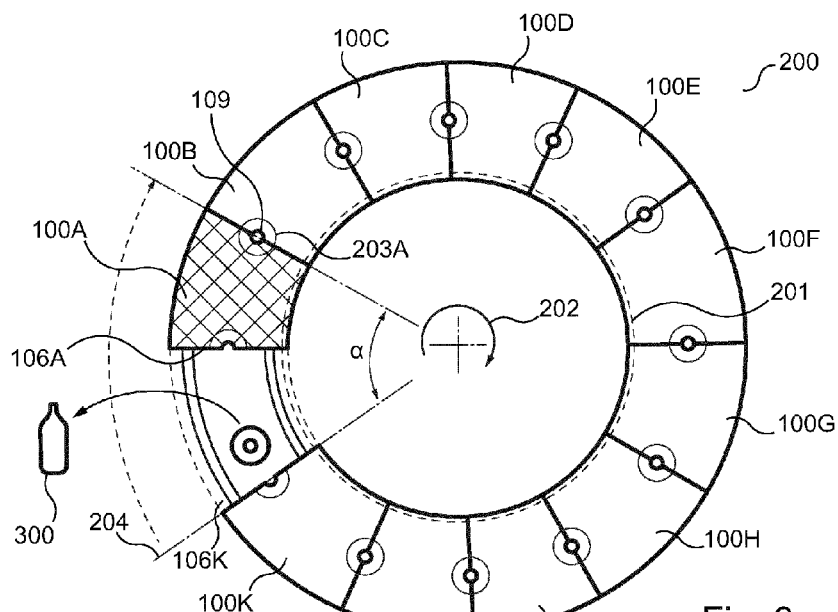
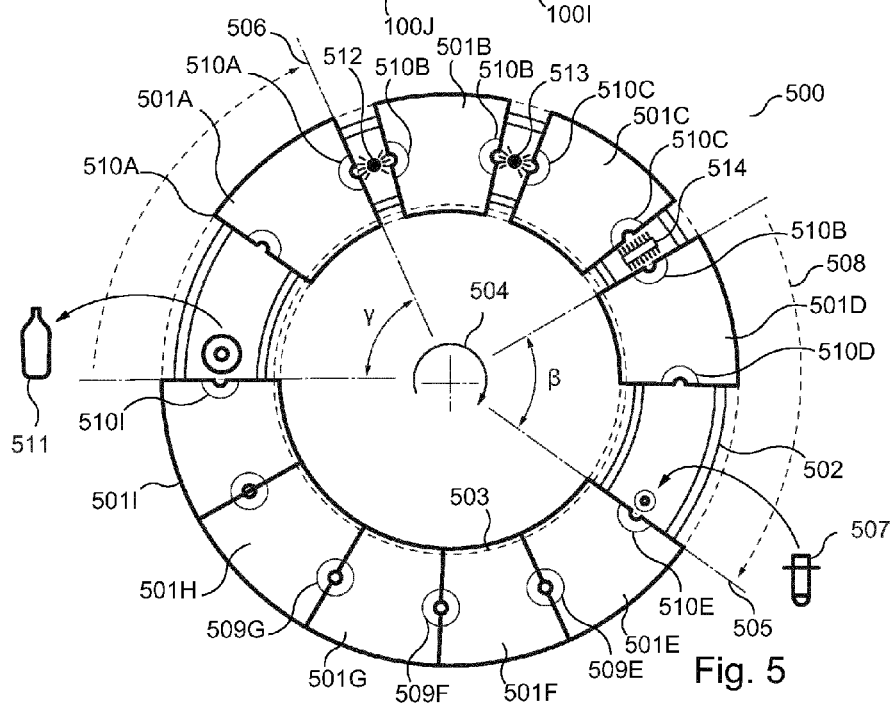
Fig. 3
Fig. 5

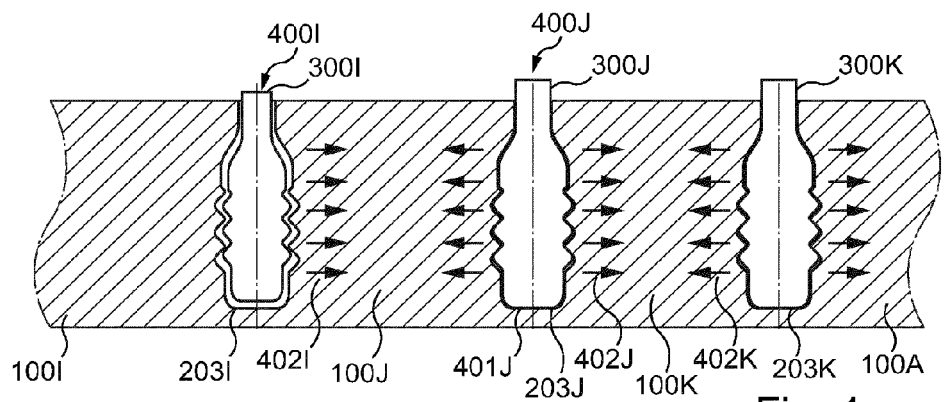
Fig. 4
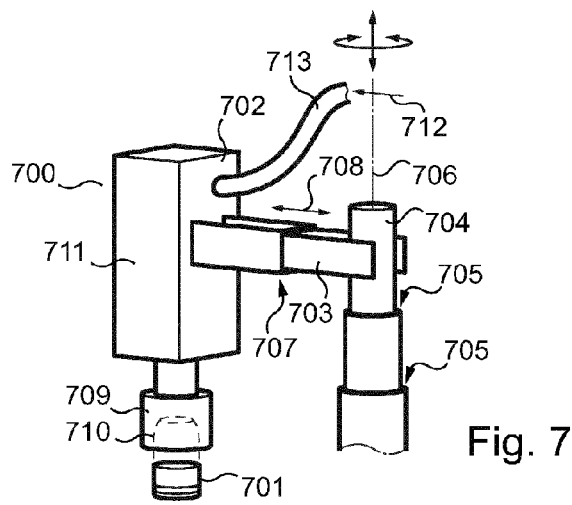
Fig. 7
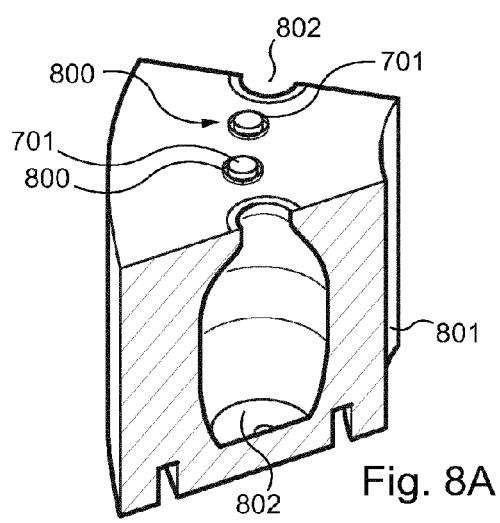
Fig. 8A
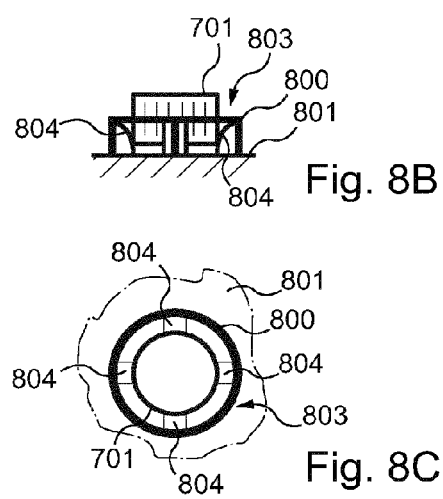
Fig. 8B
Fig. 8C

APPARATUS AND METHOD FOR FABRICATING CONTAINERS

CROSS-REFERENCE TO RELATED APPLICATION

This application is the U.S. national phase of PCT Application No. PCT/EP2013/075632 filed on Dec. 5, 2013, which claims priority to EP Patent Application No. 12198191.4 filed on Dec. 19, 2012, the disclosures of which are incorporated in their entirety by reference herein.

FIELD OF THE INVENTION

This invention relates generally to an apparatus for fabricating containers. This invention also relates to a method for fabricating containers, as well as the containers so produced.

BACKGROUND OF THE INVENTION

It is well known to fabricate containers by process of blow molding, wherein a blank parison or "preform" is positioned within the cavity of a mold and injected with a pressurized gas, usually air, causing it to inflate and assume the contours of the mold cavity. The contours of the mold are configured in the shape of a container, such that when the preform is inflated within the mold it is thereby formed into a container.

One common variant of this is the stretch blow molding process, wherein the preform is mechanically stretched along a longitudinal axis while being inflated. Preforms used in a stretch blow molding process have a closed end, such that the preform generally resembles a test tube with a closed end and a mouth at an open end. These preforms are also generally provided with flanges, threads, etc. at the mouth, to permit the attachment of a closure device to the mouth of the finished container.

During the stretch blow molding process, a stretching rod or similar device is inserted into the mouth of the preform and advanced, pushing at the preform from within and stretching it along its longitudinal axis as the air is injected. The mouth of the preform remains substantially un-deformed, while the body of the preform is stretched and expanded to match the contours of the mold in which it has been placed.

Stretch blow molding is thus particularly well-suited for the fabrication of elongated containers, namely those used for packaging mineral water and other beverages. While this document is concerned with the use of the stretch blow molding process for the fabrication of beverage containers, it should be understood that the principles discussed herein may be equally applicable to the fabrication of containers for other substances and applications.

Apparatuses for stretch blow molding comprise, at the least, the aforementioned mold (optimally provided in two or more mobile segments to facilitate extraction of the finished container) and an injection head for injecting pressurized gas into the cavity of the preform, and possibly inserting and removing the stretch rod.

The apparatus may have a single chamber, but more frequently is provided in a multiple-chamber form with multiple molds. Using multiple molds will improve the output of the container fabrication process, which is greatly advantageous in commercial container fabrication and bottling operations.

In high-volume stretch blow molding implementations, these molds are conventionally disposed upon the circumference of a large, rotating wheel. The mold is opened when the wheel reaches a certain angular position, the preform is inserted and the mold closed around it, and the injection head injects the gas into the preform as the wheel rotates, such that by the time the wheel returns to the initial angular position the container within the mold segment is completely formed and removed for cleaning, filling, and sealing.

By utilizing a wheel with multiple molds and having multiple injection heads acting on multiple preforms disposed within the molds, containers may be produced continuously and at a very high rate of production relative to a single-mold apparatus. When operated in combination with a filling and sealing line, tens of thousands of filled and sealed containers may be so produced. Generally speaking, the higher the number of mold cavities disposed on the wheel, the higher the rate at which the containers may be fabricated.

One particular embodiment of this principle is found in the document EP1226017, which describes a molding apparatus wherein there is a plurality of mold segments each configured so as to form a mold cavity with the corresponding face of an adjacent mold segment. These mold segments are not disposed upon the edge of a wheel, but at the ends of radial supports resembling spokes, so as to revolve about a common axis.

The radial supports may be further adapted with means to permit the radial displacement of the mold segments, both in an absolute sense and relative to each other, and may be further adapted so as to permit an axial displacement of a mold segment. By way of these displacement means, each of the mold cavities between the mold segments are opened and closed during the operation of the molding apparatus.

However, the apparatuses known in the prior art require a considerable amount of floor space when implemented in a container fabricating and filling operation. Along with the wheel-shaped forming apparatus, one need supply at least an apparatus for filling the containers with the liquid product, as well as transport belts or carriers for moving the preforms and containers between them. This limits the production that any one facility may realize for a given floor space and may make an increase in production prohibitively expensive.

Furthermore, the apparatuses known in the prior art require a great deal of energy to operate. Specifically, it is desirable to clamp the mold segments together during the molding operation to prevent the formation of a mark in the surface of the container along the parting line where the mold segments meet. One must therefore furnish means of clamping the mold segments together with great force. This requires a great deal of energy and entails the addition of still more machinery, further increasing the space required for the molding apparatus and the complexity of its construction and operation.

It is therefore an object of this invention to provide a molding apparatus which is more space-efficient than the ones known in the art, and which consumes less energy during the production of containers.

SUMMARY OF THE INVENTION

According, therefore, to a first aspect, the invention is drawn to an apparatus for fabricating containers, comprising a plurality of mold segments, each of said mold segments being provided with at least two substantially opposite faces configured to form a mold cavity when abutted against an opposite face of another mold segment, said mold cavity substantially defining the form of a container; and a guiding means configured to serially conduct said plurality of mold segments in a cyclical succession along a closed path, the length of said closed path being greater than a total length of said mold segments when abutting against each other.

According to the invention, said apparatus is characterized in that it comprises at least one injecting head, said at least one injecting head configured to inject a volume of liquid into a cavity of a substantially-tubular preform positioned between two of said mold segments and at least partially disposed within the mold cavity formed by said mold segments, thereby causing said preform to expand into the contours of the mold cavity and form a container; and further characterized in that each mold segment is conducted along the closed path through at least one manipulation zone of said closed path at an increased speed relative to the speed of the immediately adjacent mold segments, said apparatus comprising a positioning manipulation zone wherein said preform is inserted into said apparatus, and an extracting manipulation zone wherein said container is extracted from said apparatus.

This is advantageous in that when the liquid injected into the preform is that which is packaged within the container, the container is fabricated and filled with a product in a single step and by a single apparatus. An apparatus according to the invention will therefore obviate the need for any additional means for filling the containers or transporting them from the forming apparatus to the filling apparatus.

This aspect is further advantageous in that a container-fabricating apparatus so configured will consume less energy to fabricate a container than the ones known in the art, in that the pressure increase within the mold cavities during the operation of the apparatus are employed to ensure that each container is properly molded.

During the operation of the apparatus, the pressure within the mold cavities is elevated as the liquid is injected into the preform and the preform is expanded. When the preform is expanded into contact with the wall of the mold cavity itself, it is necessary to hold the mold segments together, such that the expanding preform does not push the mold segments apart but instead assumes the smallest details of the form of the mold cavity.

At the instant a particular preform is expanded into contact with the surface of the mold cavity, the preform in the cavity immediately following it will be pressurized from the injection of the liquid into the preform positioned therein. The container within the immediately preceding cavity will have been nearly completely formed, itself exerting a pressure on the walls of the preceding mold cavity. The two mold segments which form the mold cavity into which the particular preform is expanding into contact are thereby held together by the pressure within the immediately adjacent cavities.

In this way, the amount of energy required to maintain the mold segments together at the moment when the preform is expanded into the contours of the mold cavity is reduced, improving the economy and efficiency of the operation of the apparatus. The quality of the containers produced is also improved, in that the formation of a mold separation line in the container is prevented by the compressive force on the mold segments.

According to a feature, the apparatus is provided with at least two manipulation zones, the preform being inserted into the mold cavity at a positioning manipulation zone and the container removed from two immediately adjacent mold segments at an extracting manipulation zone.

This is advantageous in that performing the insertion of the preform and the removal of the container at two different manipulation zones will result in a portion of the closed path in which there is no preform or container disposed within the mold cavities. This portion of the closed path may be employed to carry out any of a number of ancillary steps enhancing the operation of the apparatus. In this way, the capability and flexibility of the apparatus and its operation are enhanced.

In a preferable embodiment, a means for cleaning said mold cavities is provided between said extracting and positioning manipulation zones. This is advantageous in that the mold cavities are thereby regularly cleaned without having to stop the molding apparatus or otherwise interrupt the production of containers. Furthermore, providing a means for cleaning in the apparatus ensures that the mold cavities are free of dirt, grease, or other such contaminants, improving the cleanliness and quality of the containers produced and maintaining the purity of the products held therein.

According to another feature, the apparatus further comprises at least one closure device for applying a closure to a mouth of a container, said at least one closure device being disposed so as to move in concert with a mold segment.

This is advantageous in that the entire range of processes required to produce a container ready for sale are combined in a single apparatus. The space required for a container fabricating and filling operation is thereby reduced as compared to the prior art, permitting one to increase production without requiring a corresponding increase in factory floor space. Furthermore, carrying out the entire forming and filling process on a single machine reduces the complexity of the operation as a whole. The capacity and economy of the production of filled containers is thereby improved.

Preferably, the at least one closure device is positioned relative to the container by the relative motion of the mold segments forming the mold cavity in which said container is formed.

This is advantageous in that the closure device is positioned relative to the mold cavity without need for an additional actuator or other motion device, the positioning of the closure device being effectuated by the motion of the mold segments along the closed path, e.g. though a manipulation zone. The apparatus is thereby rendered simpler, more reliable, and less expensive to operate.

According to another feature, there is one closure device provided for every mold segment.

This is advantageous in that the speed at which the apparatus may be operated is maximized As there is one closure device for every mold segment, the portion of the cycle dedicated to positioning the closure device over the container is minimized. In this way, the total time of each cycle of operation of the apparatus is minimized. The output of the apparatus is thereby improved.

Alternately, there is one closure device provided for every two mold segments.

This is advantageous in that the overall complexity of the apparatus is reduced. By providing one closure device for every other mold segment, the total number of closure devices is reduced, resulting in a corresponding reduction of components in the apparatus. The operation of the apparatus is thereby rendered more reliable.

According to another feature, each closure device is mounted upon a mold segment.

This is advantageous in that the overall complexity and size of the apparatus is reduced. Since the closure device is mounted upon, and thereby mobile with, a mold segment, it is unnecessary to provide additional actuators to move the closure device. Furthermore, the combination of the closure device with a mold segment will result in a smaller container production line overall. The apparatus according to the invention thus offers improved performance in a more compact package relative to the apparatuses known in the art.

According to still another feature, each mold segment comprises a retaining means for retaining a closure in proximity to a mold cavity prior to its application to the container within said mold cavity.

This is advantageous in that the closure is pre-positioned prior to its application to the container. The range of motion required for the operation of the closure device is thereby minimized, improving the speed at which the closures are applied to the containers and maximizing the output of the apparatus.

According to still another feature, said closed path is provided in the form of a polygon with rounded corners.

This is advantageous in that the closed path is configured so as to comprise a number of straight sections, corresponding to the faces of the polygon. Each of the faces may be provided with manipulation zones, injection heads, closure devices, etc. such that as each mold segment passes along the segment of the closed path corresponding to a face of the polygon, a container is produced. The provision of rounded corners serves to maintain a smooth transit of the mold segments about the closed path, maintaining speed and efficiency of operation of the apparatus and reducing wear. In this way, one effectively combines several apparatuses into one, thereby increasing the output of the apparatus and rendering its operation more cost-effective.

According to a second aspect, the invention is drawn to a method for the continuous fabrication of containers, comprising the steps of (a) providing a molding apparatus comprising a plurality of mold segments, each of said mold segments being provided with at least two substantially opposite faces configured to form a mold cavity when abutted against an opposite face of another mold segment, said plurality of mold segments being disposed upon a guiding means conducting said mold segments in a cyclical succession along a closed path, the length of said closed path being greater than a total length of said mold segments when abutting against each other; (b) passing a first mold segment through a positioning manipulation zone disposed along said closed path at an increased speed relative to an adjacent second mold segment, thereby opening the mold cavity disposed within said first and second mold segments; (c) positioning a substantially tubular preform between said first and second mold segments, said preform defining a preform cavity and having a mouth disposed at an open end communicating with said cavity; (d) passing the second mold segment through the positioning manipulation zone and accelerating it relative to the adjacent first mold segment, thereby abutting a first face of said first mold segment against an opposite second face of said second mold segment, said preform being thereby at least partially enclosed within a mold cavity formed by said first and second faces; and (e) injecting a volume of a liquid into the cavity of the preform, thereby inducing said preform to expand into the contours of the mold cavity and form a container; wherein steps (b) through (e) are repeated in the molding apparatus, the container produced in the previous iteration being removed in an extracting step as the surrounding mold segments pass through an extracting manipulation zone.

This method is advantageous in that it realizes the advantages of the apparatus embodying it as described above, efficiently producing filled containers at a high rate.

In particular, the method is configured to take advantage of the cyclical nature of the motion of the mold segments along the closed path, such that a preform inserted into the mold cavity of two mold segments will be conducted about a portion of the closed path as it is being formed into a container, eventually returning to the initial point of the closed path where the method may be repeated. By providing many mold segments which form many mold cavities, the method is executed such that at any given moment, there is at least one preform/container undergoing every step of the method. In this way, the method is performed in a way that maximizes the output of formed and filled containers.

Furthermore, the method is advantageous in that the provision of a plurality of mold segments upon a closed path is inherently versatile, permitting a great number of adaptations and modifications to the basic method to meet the requirements of any particular application.

In one possible configuration, the inserting and extracting manipulation zones are coterminous.

This is advantageous in that it minimizes the complexity of the apparatus employed to carry out the method of the invention. The performance of the method of the invention is thereby rendered more efficient and reliable, improving the economy of the fabrication of containers embodying this configuration.

In another possible configuration, there is provided a separation between the extracting and positioning manipulation zones along the closed path.

This is advantageous in that the method is rendered more flexible and versatile. In particular, the separation of the extracting and positioning manipulation zones results in a portion of the closed path between the two where the mold cavities are empty. This portion may be provided as a queuing section, enabling the apparatus to adjust to variations in the speed of its operation without disrupting the feed of the mold segments through the closed path.

Alternately, the portion of the closed path between the extracting and positioning manipulation zones may be employed for the performance of ancillary steps not strictly necessary for the fabrication of a container but which must be periodically performed to maintain the integrity of the operation, such as inspection, lubrication, or cleaning steps.

Preferably, the method comprises at least an additional step for cleaning the mold cavity after the removing step. This is advantageous in that a high level of cleanliness is maintained in the containers produced by the method, without requiring one to periodically halt the process and disassemble the apparatus to clean its components. In this way, the output of the method of the invention is maintained at a highest possible level of quality, without sacrificing efficiency of operation.

According to another feature, the method further comprises a closing step after the injection step, wherein a closure is applied to said container by a closure device, said closure device being positioned by the relative motion of the first and second mold segments through a manipulation zone.

This is advantageous in that the incorporation of a closing step will result in a container that is fabricated, filled, and sealed in a single process which is economically performed by a single apparatus. The entire process of producing a container which is ready for sale is thus performed in as few steps, and with as few machines, as possible, reducing the overhead costs of such an operation and permitting a greater number of production lines to be located in the same factory space. The process is thereby made more economical.

According to another feature, the method is performed over two laps of the closed path, the positioning and injecting steps being performed during the first lap and the closing and extracting steps being performed during the second lap.

This is advantageous in that performing the method over two laps of the closed path will double the effective length of the closed path, while maintaining its actual length unchanged. In this way, the method may be adapted to produce containers which require different forming rates or characteristics, without modifying the line itself or altering the speed at which the mold segments are conducted about it. In this way, the method is rendered more versatile and adaptable.

According to still another feature, the steps of the method are repeated at least twice over each circuit of the closed path.

This is advantageous in that the method produces more than one container per mold cavity for each lap of the closed path the mold segments make. In this way, the output of the method and the apparatus embodying it are improved.

According to a third aspect, the invention is drawn to a beverage container as produced by the method described above.

This is advantageous in that such a beverage container will embody the advantages of the method as previously enumerated.

Other particularities and advantages of the invention will also emerge from the following description.

BRIEF DESCRIPTION OF THE DRAWINGS

In the accompanying drawings, given by way of non-limiting examples:

FIG. 3 is a top orthogonal view of the apparatus of FIG. 2, during an extracting step;

FIG. 4 is a side section view of an apparatus during an injecting step;

FIG. 5 is a top orthogonal view of an apparatus according to the invention in a second embodiment;

FIG. 7 is a perspective view of a closure device and a closure upon which it is configured to operate;

FIG. 8 is a perspective view of a mold segment comprising a retaining means for retaining a closure, according to a feature of the invention;

DETAILED DESCRIPTION

As the method and apparatus of this invention deal with containers fabricated by blow molding, the basic principles and components of blow molding processes and apparatuses, including those in which employ a liquid as the working fluid, are taken as understood by the reader. The following description should therefore be read in this context.

Figure 1:
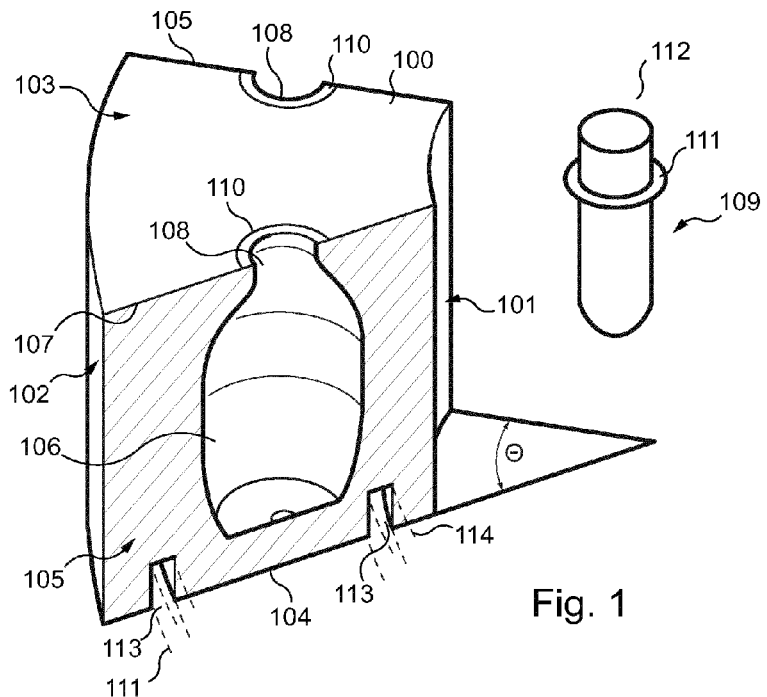
FIG. 1 is a perspective view of an embodiment of a mold segment according to a first embodiment of the invention.

FIG. 1 depicts a first mold segment 100 according to a first embodiment of the invention. The first mold segment 100 is a block substantially in the form of a segment of an extruded annulus, being thereby provided with a substantially parallel interior face 101 and exterior face 102 and a substantially parallel top face 103 and bottom face 104. The first mold segment 100 is further provided with two substantially opposite mold faces 105, said mold faces 105 being disposed so as to converge at an angle T defining the segment.

The mold faces 105 are provided with a first mold depression 106, which is in this embodiment configured to substantially define one half of the form of a beverage container. The first mold depression extends to the top edge 107 of the mold face 105, thereby forming the neck hole 108 in the top face 103 of the first mold segment 100. When the mold face 105 of the first mold segment 100 is abutted against a corresponding mold face of another mold segment, the two first mold depressions 106 will thereby form a mold cavity which substantially defines the form of a container.

The neck hole 108 is preferably configured so as to just accommodate the insertion of a substantially-tubular first preform 109, depicted here for reference. The top face 103 of the first mold segment 100 is further provided with a counterbore 110, such that a flange 111 of the first preform 109 will seat therein when the first preform 109 is disposed within the mold cavity formed by the first mold depressions 106. An open end 112 of the first preform 109 will therefore sit outside the mold cavity when two first mold segments 100 are closed about it, the rest of the first preform 109 being disposed within the mold cavity.

Of course, the exact form of the first mold depressions 106 and the mold cavity they form, as well as the necessary size and proportions of the first preform 109 needed to form a container in that mold cavity, may be readily determined by one skilled in the art.

The first mold segment 100 is further provided with a means for interfacing with a guiding means, as depicted here in the rail grooves 113. The rail grooves 113 are configured to accommodate the rails 114, depicted here in dashed lines. The rails 114 are configured to form a closed path, such that the first mold segment 100 may be cyclically conducted about said closed path. In this embodiment the rail grooves 113 are plain, though it may instead be advantageous to provide rollers, wheels, lubrication, or other such means for facilitating the motion of the first mold segment 100 upon the rails 114 and about the closed path.

Figure 2:
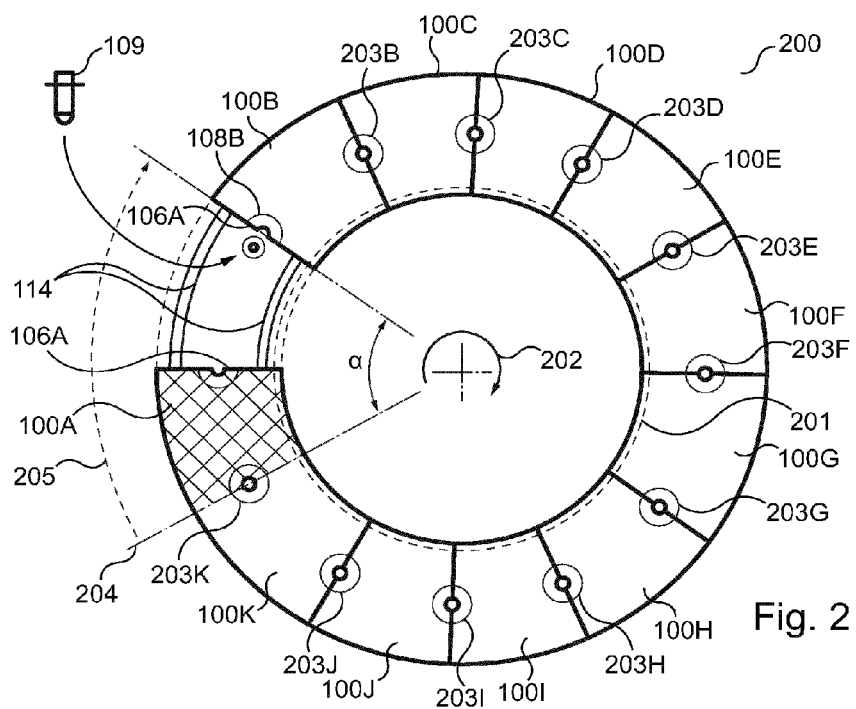
FIG. 2 is a top orthogonal view of an apparatus according to the invention in the first embodiment, during a positioning step.

FIG. 2 depicts a first apparatus 200 for fabricating containers, according to the first embodiment, during a positioning step. The first apparatus 200 here comprises eleven first mold segments 100, here numbered as 100A through 100K. The first mold segments 100A-100K are disposed upon a pair of rails 114 which are here configured in a circle; the first mold segments 100A-100K may thus circulate about the first closed path 201 (here represented in a dashed line, offset from the centerline of the first mold segments 100A-100K for clarity).

This embodiment is exemplary and it should be understood, of course, that more or fewer mold segments may be provided, according to the requirements of the particular application in which the apparatus is to be employed.

During the operation of the apparatus, the first mold segments 100A-100K are conducted around the first closed path 201 on the rails 114 at a globally constant speed 202. The first mold segments 100A-100K may be conducted about the first closed path 201 by propulsion means such as chains, belts, rollers, gears, or any other means appropriate to the particular application in which the first apparatus 200 is to be employed.

In this embodiment, the first mold segments 100A-100K circulate about the first closed path 201 in a substantially contiguous bloc, being abutted end-to-end. The first mold segments 100A-100K thereby form the first mold cavities 203A-203K (203A is not shown in this figure).

During the positioning step, the first mold segment 100A is advanced into the manipulation zone 204. The manipulation zone 204 corresponds to the segment of the circular closed path defined by the angle a. In this embodiment, the size of the manipulation zone 204 is substantially equal to the space occupied by two first mold segments 100, though the size of the manipulation zone 204 may in fact be increased or decreased according to the particular operational characteristics of the apparatus, such as the size of the containers it is employed to produce.

Upon entering the manipulation zone 204, the first mold segment 100A is passed along the first closed path 201 with an acceleration 205. This will cause it to approach the first mold segment 100B, ultimately abutting against it. The first preform 109 is then inserted into the mold cavity 200A (not shown) formed by the first mold depressions 106A and 106B.

It should be understood that for illustrative purposes the first preform 109 is depicted in FIG. 2 in the position where it will be inserted into the mold; however, during the operation of the first apparatus 200 the mold segments 100A and 100B are abutted against each other before the first preform 109 is inserted into the mold cavity 200A (not shown). Preferably, the means for inserting the first preform 109 are configured to avoid scraping, scratching, or other unnecessary contact between the first preform 109 and the mold segments 100A and 100B.

FIG. 3 depicts the first apparatus 200 of FIG. 2, in an extracting step. The first mold segment 100A has advanced to the end of the manipulation zone 204, coming into abutment with the first mold segment 100B and enclosing the first preform 109 in the first mold cavity 203A. At the same time, the first mold cavity 203K depicted in FIG. 2 is opened by the passing of the first mold segment 100A through the manipulation zone 204, exposing the first mold depressions 106A and 106K and permitting the finished first container 300 to be extracted from within.

Preferably, the positioning and passing steps depicted in FIG. 2 and the extracting step depicted in FIG. 3 are performed substantially simultaneously. In other words, the first preform 109 is positioned in between the first mold segments 100A and 100B and the first container 300 is extracted from between the first mold segments 100A and 100K at the same time, while the first mold segment 100A is being passed though the acceleration zone 204 with acceleration 205 between the two positions depicted in FIGS. 2 and 3. The manipulation zone 204 thus acts both as a positioning manipulation zone and an extracting manipulation zone.

During the operation of the first apparatus 200, the first preform 109 is positioned between the first mold segments 100A and 100B. The first preform 109 is enclosed within the first mold cavity 203A, preferably with an open end protruding from the first mold segments 100A and 100B as described above, when the first mold segment 100A is passed through the manipulation zone 204. As the first mold segments 100A and 100B are conducted around the first closed path 201, an injection means injects a liquid into a cavity of said preform, inducing it to expand into a first container 300 which is extracted when the first mold segments 100A and 100B come back around to the manipulation zone 204.

The first apparatus 200 is most advantageously configured such that a first preform 109 is inserted and a first container 300 removed each time a first mold segment 100 is passed through the manipulation zone 204. By providing a plurality of injection means, one may employ the first apparatus 200 to fabricate and fill large quantities of containers.

Furthermore, the first apparatus 200 realizes a considerable energy savings relative to the machines known in the art, in that it is not necessary to provide means for clamping the first mold segments 100 together during the forming process, as demonstrated in FIG. 4.

FIG. 4 depicts a cross-section of the first mold segments 100I to 100A of the first apparatus 200 at the moment depicted in FIG. 2. In FIG. 4, there are three containers 300 at different stages of their fabrication. The first container 300I is nearly complete, having been expanded by the injection of liquid 400I into all but the smallest details of the of the first mold cavity 203I. The first container 300J is depicted at the moment where its fabrication is complete; the injection of liquid 400J has caused the first container 300J to assume all of the details of the first mold cavity 203J. The first container 300K is completed, but still remains pressurized and disposed within the first mold cavity 203K as the first mold segment 100A has not yet been passed through the manipulation zone.

In order to prevent a separation line from being molded into the first container 300J where the first mold segments 100J and 100K separate at seam 401J, it is necessary to maintain the first mold segments 100J and 100K together. While the first mold segments 100J and 100K are initially positioned in abutment, the expansion of the first container 300J into the small details of the first mold cavity 203J will exert a lateral force 402J on the first mold segments 100J and 100K. The first mold segments 100J and 100K are prevented from separating by the lateral forces 402I and 402K exerted on the first mold segments 100J and 100K, respectively. The lateral forces 402I and 402K, generated by the pressurization within the containers 300I and 300K respectively, will counteract the lateral forces 402J, maintaining the first mold segments 100J and 100K in abutment and preventing the formation of a separation line in the first container 300J.

It should be understood that the person skilled in the art will have a great deal of flexibility in choosing where along the closed path the injection of the liquid and the fabrication of the container is completed. While in this embodiment the first mold cavities 203I-203K are disposed as close as possible to the manipulation zone 204, one may optionally configure the apparatus such that there are additional first mold segments 100 between the manipulation zone 204 and the first mold cavity 203 in which the fabrication of the first container 300 is being completed. For instance, it may be preferable to provide a space between the conclusion of injection and the extraction of the finished first container 300, e.g. to permit the liquid in the container to settle or for any foam therein to dissolve.

FIG. 5 depicts a second apparatus 500, according to a second exemplary embodiment. The second apparatus 500 is similar to the first apparatus 200 depicted in FIGS. 2-4: it comprises a plurality of second mold segments 501A to 501I, disposed upon the rails 502 and being moved around the second closed path 503 (depicted here, as above, offset from the centerline of the second mold segments 501A to 501I for clarity) at a globally constant speed 504.

The operation of the second apparatus 500 is substantially the same as in the first apparatus 200 of the first embodiment. The second apparatus 500 differs, however, in that it comprises two manipulation zones: a positioning manipulation zone 505 defined by the angle beta, and an extracting manipulation zone 506 defined by the angle gamma. At the positioning manipulation zone 505, a second preform 507 is positioned between the second mold segments 501D and 501E. The second mold segment 501D is passed through the positioning manipulation zone 505 with an acceleration 508, such that it will abut the second mold segment 501E and enclose the second preform 507 within a second mold cavity 509D (not pictured) formed from the second mold depressions 510D and 510E.

At the opposite side of the second apparatus 500, the second mold segment 501A has been passed through the extracting manipulation zone 506, separating the second mold segment 501A from the second mold segment 501I and exposing the second container 511 such that it may be removed from the second apparatus 500.

The second apparatus 500 is configured such that the second mold segments 501 not disposed between the positioning manipulation zone 505 and the extracting manipulation zone 506, i.e. those in which there is not a second preform 507 in the process of being fabricated into a second container 511, are not abutted against each other but instead are separated by gaps along the second closed path 503. The exact length of these gaps may be determined by those skilled in the art for each particular application, by varying such factors as the overall size of the apparatus, the size of the second mold segments 501 themselves, the speed 504, and the acceleration with which the second mold segments 501 are passed through the positioning and extracting manipulation zones 505 and 506.

The gaps between the mold segments 501 permit a great deal of flexibility in the design of the apparatus. In this second embodiment, a series of mechanisms are disposed in the gaps for cleaning and drying the mold depressions 510 disposed in the mold segments 501.

Specifically, a washing means 512 is positioned in the gap between the second mold segments 501A and 501B, and is configured to wash the mold depressions 510A and 510B facing the gap. Similarly, a rinsing means 513 is positioned in the gap between the second mold segments 501B and 501C, and a drying means 514 is positioned in the gap between the second mold segments 501C and 501D. The mold cavities 509 are thereby kept as clean as possible, maintaining a high level of quality in the output of the second apparatus 500 in an industrial setting.

Figure 6:
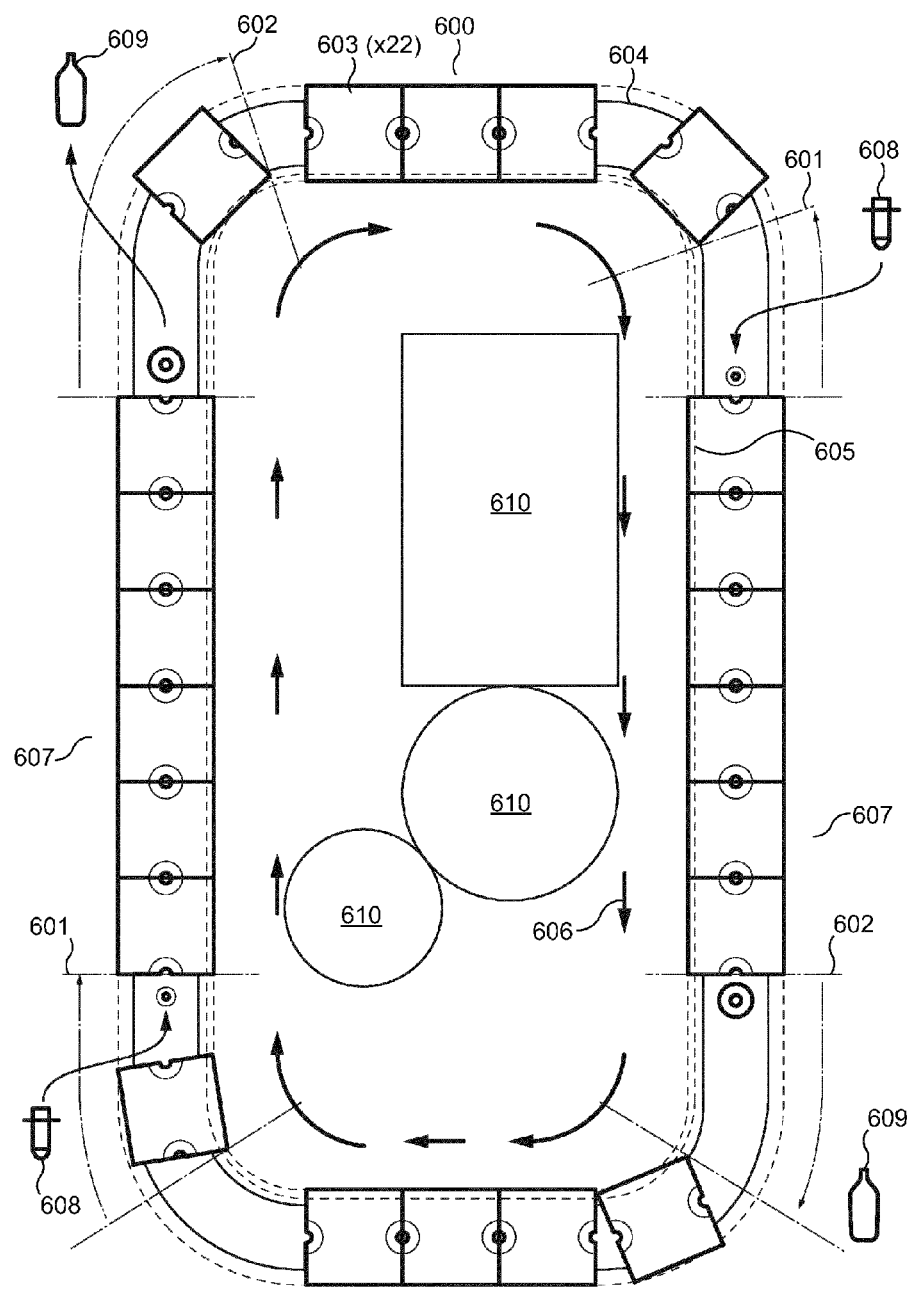
FIG. 6 is a top orthogonal view of an apparatus according to the invention in a third embodiment.

FIG. 6 depicts a third embodiment, similar again to the first and second embodiments described in the preceding Figures. The third apparatus 600 is further provided with four manipulation zones: two positioning manipulation zones 601 and two extracting manipulation zones 602. Twenty-five third mold segments 603 are disposed upon rails 604, which conduct the third mold segments 603 about a third closed path 605 with a rotation 606, the third closed path 605 being substantially configured in the shape of a rectangle with rounded corners.

The two positioning manipulation zones 601 and two extracting manipulation zones 602 are positioned in pairs on the long sides of the third closed path 605, such that a third mold segment 603 being conducted about the third closed path 605 will be passed through a positioning manipulation zone 601 at the beginning of a long side 607 of the third closed path 605, be conducted along the long side 607 of the third closed path 605, and be passed through an extracting manipulation zone 602 at the end of the long side 607. Along each of the long sides 607 are ideally disposed means for injecting a liquid into a third preform 608 to expand it into a third container 609. The third apparatus 600 is thereby configured to fabricate twice as many containers for each lap of a mold segment around a closed path as the first and second apparatuses 200 and 500.

In a possible variant mode of realization, one may provide four manipulation zones, one on each corner of the third apparatus 600, each functioning as both a positioning and an extraction manipulation zone as in the apparatus depicted in FIGS. 2 and 3. Such a configuration would result in one container being produced by a given mold cavity for each side of the third apparatus 600.

Furthermore, each of the corners would by its nature serve as a manipulation zone, in that the third mold segments 603 will undergo an angular acceleration and separate from each other as shown in FIG. 6. These separations may thus be employed to insert and remove preforms and containers, thereby permitting the apparatus to be further reduced in size.

It should be understood that while the three embodiments discussed up to this point employ closed paths 201, 503, and 605 configured in substantially regular forms, one advantage of the invention is that the closed path of an apparatus may be provided in infinitely many different forms. The closed path may therefore be optimized for each particular installation, for instance to meet certain required production levels or to adapt to an irregular factory space.

Thus, while the three apparatuses 200, 500, and 600 are disposed in substantially circular and rectangular forms, it is of course possible to employ other regular polygons (e.g. a triangle), non-convex polygons (e.g. a star), or even irregular shapes, with single or multiple positioning and extracting manipulation zones.

Furthermore, the closed path may be adapted to enclose other machinery necessary to the container fabrication process but not incorporated into the apparatus per se. In FIG. 6, it is shown that the area inside the apparatus 600 is partially occupied by the ancillary machinery 610. Depending on the particular installation, this ancillary machinery may include any or all of preform thermal conditioners; liquid reservoirs, filters, pumps, and/or other systems for furnishing and injecting the liquid; control systems, automation equipment, and/or operator stations; or other equipment necessary to the process. In this way, the overall factory floor space required for the installation and use of the apparatus is minimized.

FIGS. 7-10 will disclose several additional features which further increase the effectiveness of a container-fabrication apparatus as described with reference to FIGS. 1 through 6.

FIG. 7 depicts a closure device 700 for applying a closure 701 to a mouth of a container. Here, the closure 701 is a standard twist-off cap; however, those skilled in the art will recognize that other closure means such as plugs, crown corks, or the like may be employed with appropriate adaptation.

The closure device 700 comprises generally a closure head 702, which is attached by an arm 703 to a mast 704. It is necessary that the closure device 700 be capable of engaging and disengaging from the closure 701 during operation of an apparatus with which it is integrated, and preferable that it be capable of further degrees of motion. The mast 704 comprises at least one telescoping joint 705, and is preferably provided with means to permit it to rotate and translate about its vertical axis 706. The arm 703 is also provided with a sliding joint, permitting the head 702 to be displaced in the radial direction 708.

In this way, the closure head 702 can be displaced relative to a container, permitting the most efficient application of the closure 701.

The motion of the closure device 700 may be effectuated by means well-known to those skilled in the art, for instance gearing, racks or leadscrews; pulley and cable or cog and chain arrangements; pneumatic or hydraulic actuators; linear electric motors, or any combination thereof. It is preferable to configure this equipment such that as much of it is fixed as possible, such as by disposing it within the base of the mast 704. This will reduce the inertia of the closure device 700 and permit it to be positioned as quickly and efficiently as possible during operation.

The head 702 is provided with a closure socket 709, configured to act upon the closure 701. In this embodiment, the closure socket 709 is provided with an inner cup 710, which is shaped to grasp the closure 701 when pressed upon it. Preferably, the inner cup 710 retains the closure 701 just tightly enough to prevent it from falling out during positioning and to permit it to be screwed onto a container, but not so tightly as to damage the closure 701 if overly-tightened or to impede the head 702 of the closure device 700 from being disengaged from the closure 701 once applied.

While this document employs friction to retain the closure 701 in the closure socket 709 during operation, it should be understood that other retaining means such as mechanical pincers or vacuum suction may alternately be employed.

The closure socket 709 is rotatably driven by an actuator 711 housed within the head 702 of the closure device 700. In this embodiment, the actuator 711 is a pneumatic motor, driven by pressurized air 712 fed in through the air supply hose 713. In other embodiments, it may instead be preferable to employ other kinds of actuators, for instance a stepper motor.

Preferably, the apparatus is configured with manipulation zones positioned such that the mold segments are separated, and the mold cavity thereby held open, during the closure of the finished container. This is especially preferable in that it maximizes the clearance between the closure means and the rest of the apparatus during the operation of the former.

FIG. 8A depicts a mold segment provided with a pair of retaining means 800 for retaining a closure 701, according to a feature of the invention, while FIGS. 8B and 8C respectively depict side and top detail views of the retaining means 800.

As can be seen in FIG. 8A, a fourth mold segment 801 is provided with a pair of retaining means 800, disposed upon the fourth mold segment 801 in proximity to the two mold depressions 802 disposed therein. The retaining means 800 will thus retain a closure 701 in close proximity to the mold cavity formed by the mold depressions 802, minimizing the distance that the closure device will have to travel during the application of the closure 701 to a container fabricated by the apparatus.

FIGS. 8B and 8C respectively depict a side view and a top view of the retaining means 800. The retaining means 800 is substantially in the form of a ring 803 which surrounds a closure 701 disposed within it. The retaining means 800 is configured to hold the closure 701 in place with enough force to keep it from being jarred loose as the fourth mold segment 801 is moved, but not so much as to impede the removal of the closure 701 by a closure device when the closure 701 is to be applied to a container.

In this embodiment, this is accomplished by providing a plurality of leaf springs 804, disposed about the interior of the ring 803. The leaf springs 804 are disposed so as to gently compress the closure 701, thereby retaining it in position yet permitting the closure 701 to be extracted without a great deal of force.

Preferably, the closure 701 is inserted in the retaining means 800 during a positioning step as described above. The exact means for inserting the closure 701 into the retaining means 800 may be adapted from techniques known in the art of materials handling and automation, and will not be discussed here.

While this embodiment employs a simple leaf spring mechanism, other embodiments may employ other means for retaining the closure 701 in place, such as clamps, tabs, suction devices, and the like. A particularly advantageous alternative is configured in the form of a peg, upon which the closure 701 is disposed, said peg having substantially the same dimensions as the mouth of a container and retaining said closure 701 by friction. Moreover, even when employing a spring-type retaining system as depicted here in FIGS. 8A to 8C, there remains room for variation in the number, size, shape, positioning, and stiffness of the leaf springs 804. The configuration of the retaining means 800 as depicted in FIGS. 8A to 8C should therefore be considered as exemplary rather than limiting.

Figure 9:
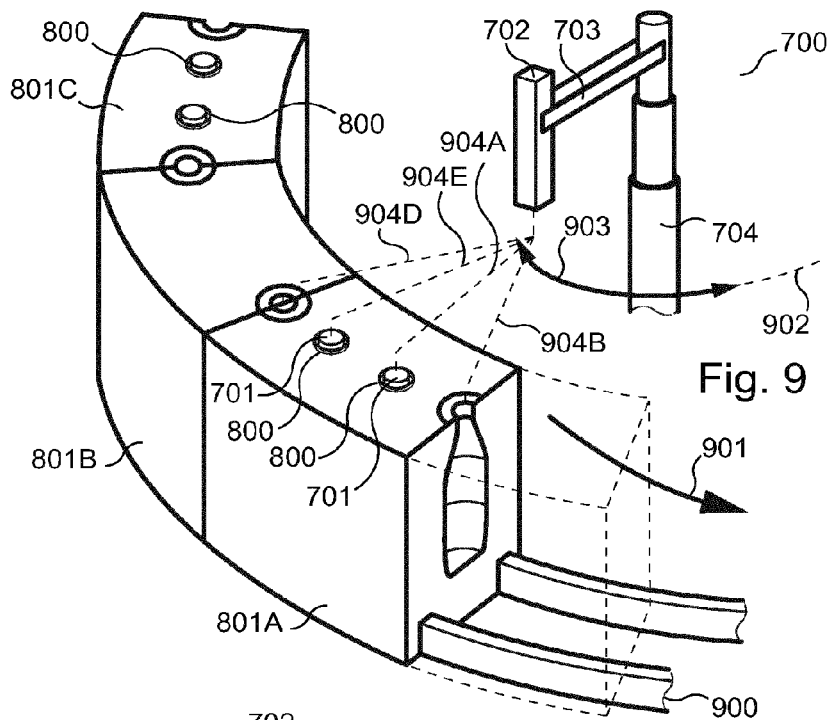
FIG. 9 is a perspective view of a trio of mold segments disposed in relation to the closure device of FIG. 7 and incorporating two retaining means of FIGS. 7.

FIG. 9 depicts the retaining means 800 of FIGS. 8A to 8C as incorporated into an apparatus 900 according to the invention. Two retaining means 800 are disposed on every other fourth mold segment 801, alternating with fourth mold segments 801 which are not provided with retaining means 800. As in the previous embodiments, the fourth mold segments 801A to 801C are borne along the closed path 901 of which this Figure depicts a portion.

A closure device 700 is also provided. The closure device 700 is mounted independently of the fourth mold segments 801, upon such means as a turret or the like, such that it moves along a closure device path 902 substantially parallel with and concentric to the closed path 901 along which the fourth mold segments 801A to 801C are conducted. The closure device 700 moves along the closure device path 902 with a variable speed 903, such that the closure head 702 of the closure device 700 moves along with a respective fourth mold segment 801 A in a coarse sense, but its position relative to said fourth mold segment 801 is controllably varied in a fine sense. In other words, the closure device 700 follows the fourth mold segment 801A, but is capable of moving to different positions relative to the fourth mold segment 801A.

Of the different positions that the closure head 702 of the closure device 700 may be placed in, there are four of particular interest, 904A through 904D. During a closing step, the speed of the closure device 700 is momentarily altered such that it is disposed in position 904A. The telescoping mast 704 and the extending arm 703 position the closure head 702 upon the closure 701 held within the retaining device 800 at position 904A, grasping it securely. The closure head 702 is then displaced to position 904B, such that the closure 701 is retracted from the retaining means 800 at position 904A and screwed to a container within a mold cavity at position 904B (here omitted for clarity). The closure head 702 is then displaced to position 904C to pick up another closure 701 and subsequently to position 904D to screw it to a container disposed within a mold cavity at position 904D (again omitted for clarity).

It should be noted that, while this document has thus far described a range of components and actions that comprise the apparatus and its operation, one may vary considerably the application of these elements to achieve different effects.

Most notably, it may be advantageous to configure the apparatus 900 such that a preform will make two laps of the closed path 901 before being extracted. During a first lap a preform is positioned into a mold cavity and injected with a liquid, forming a container. The container then passes around the second lap, wherein it is closed with a closure and extracted from the mold. By alternating between preforms on their first lap and containers on their second from one mold cavity to the next, one may double the effective length of the closed path and realize the advantages described above.

Figure 10:
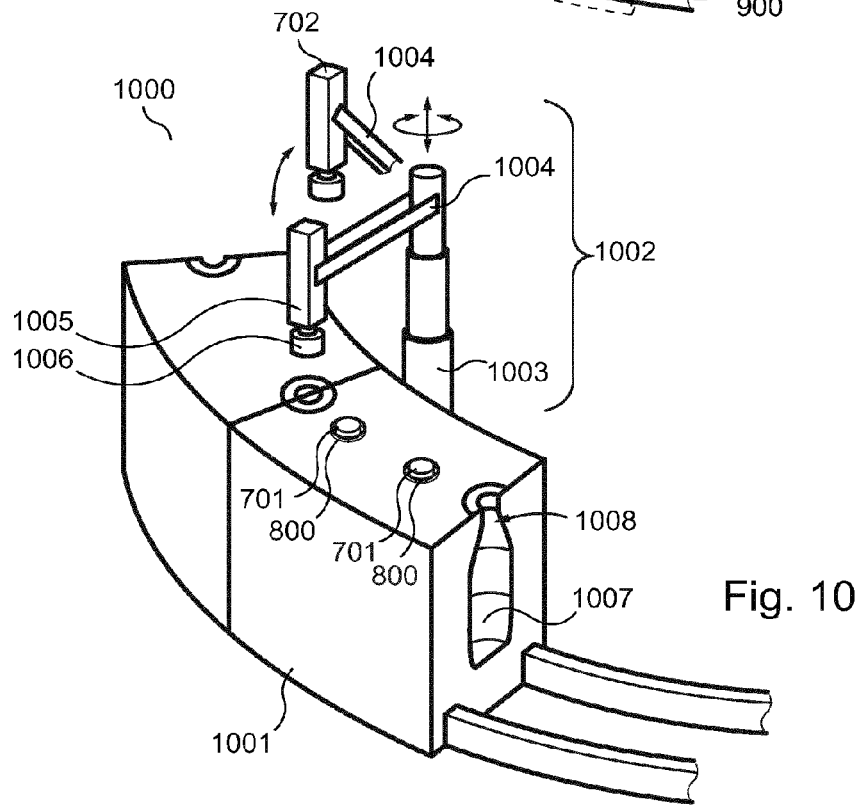
FIG. 10 is a perspective view of a mold segment comprising an injection head and the closure device of FIG. 7.

FIG. 10 depicts still another possible embodiment for an apparatus 1000 for fabricating containers. In particular, FIG. 10 depicts an exemplary fifth mold segment 1001. The fifth mold segment 1001 is substantially similar to the mold segments 100, 501, 603, and 801 heretofore presented, with the notable difference in that it includes the injection-closure assembly 1002, which is mounted thereupon. The injection-closure assembly comprises the telescoping mast 1003, to which two rigid arms 1004 are attached, though one of the rigid arms 1004 is detached for clarity. The telescoping mast is configured to extend and retract and rotate about its y axis as shown.

At the end of one rigid arm 1004 is the injection head 1005. The injection head is provided with a nozzle 1006, and is configured to inject a quantity of liquid at pressure through said nozzle 1006 into a preform (omitted for clarity) disposed within a mold cavity 1007 formed by a mold depression 1008 in the fifth mold segment 1001 and a coordinating mold depression in an abutting fifth mold segment (also omitted for clarity). At the end of the other rigid arm 1004 is a closure head 702, as described above. Upon the top of the fifth mold segment 1001 is a retaining means 800 holding a closure 701, as previously described.

During the operation of the apparatus 1000, the telescoping mast 1003 will first pivot to align the nozzle 1006 of the injecting head 1005 with the mold cavity 1007, and then descend to seat the nozzle 1006 upon the preform therein. A quantity of liquid is then injected into the preform, causing it to expand into a container substantially in the form of the mold cavity 1007. The telescoping mast 1003 will then lift the injecting head 1005 up and pivot to align the closure head 702 with the closure 701 in the retaining means 800, and then descend to "pick" the closure 701 from the retaining means and lift it out. The telescoping mast 1003 will then pivot to align the closure head 702 with the mold cavity 1007, and then descend to screw the closure to the container as discussed above.

Of course, the invention is not limited to the embodiments described above and in the accompanying drawings. Modifications remain possible, particularly as to the construction of the various elements or by substitution of technical equivalents, without thereby departing from the scope of protection of the invention.

In particular, it should be understood that the invention as described in the foregoing disclosure is of a highly modular nature, and as such is not to be considered as being limited to the forms or combinations therein. Specifically, it should be understood that the exact quantity and form of the components of the apparatus, including the mold segments, mold depressions and cavities, rails or other guiding means, closed path, etc. may differ considerably from the form of the exemplary embodiments discussed herein while still remaining within the scope of the invention.

The exact configuration and operation of the invention as practiced may thus vary from the foregoing description without departing from the inventive principle described therein. Accordingly, the scope of this disclosure is intended to be exemplary rather than limiting, and the scope of this invention is defined by any claims that stem at least in part from it.

The invention claimed is:

1. An apparatus for fabricating containers, comprising:
a plurality of mold segments, each of the mold segments being provided with at least two substantially opposite faces configured to form a mold cavity when abutted against an opposite face of another mold segment, the mold cavity substantially defining the form of a container;
a transport mechanism coupled to the mold segments and configured to serially conduct the plurality of mold segments in a cyclical succession along a closed path, the closed path having a length greater than a total length of the mold segments when abutting against each other;
at least one injecting head, the at least one injecting head configured to inject a volume of liquid into a cavity of a substantially-tubular preform located between two of the mold segments and at least partially disposed within the mold cavity formed by the mold segments, thereby causing the preform to expand into the contours of the mold cavity and form a container;
at least one manipulation zone along the closed path, each mold segment being moved through the manipulation zone by the transport mechanism at an increased speed relative to the speed of the immediately adjacent mold segments, the apparatus including a positioning manipulation zone where the preform is inserted into the apparatus and an extracting manipulation zone where the container is extracted from the apparatus; and
at least one closure device configured to apply a closure to a mouth of a container, the at least one closure device being disposed so as to move along with a mold segment over at least a portion of the closed path.

2. Apparatus according to claim 1, wherein the apparatus is provided with two manipulation zones, one of the manipulation zones being the positioning manipulation zone where the preform is inserted into the mold cavity and another being the extracting manipulation zone where the container is removed from two immediately adjacent mold segments one.

3. Apparatus of claim 2, wherein a means for cleaning the mold cavities is provided between the positioning and extracting manipulation zones.

4. Apparatus according to claim 1, wherein the at least one closure device is positioned relative to the container by the relative motion of the mold segments forming the mold cavity in which the container is formed.

5. Apparatus according to claim 1, wherein there is one closure device provided for every mold segment.

6. Apparatus according to claim 1, wherein there is one closure device provided for every two mold segments.

7. Apparatus according to claim 4, wherein each closure device is mounted upon a mold segment.

8. Apparatus according to claim 4, wherein each mold segment comprises a retaining means for retaining a closure in proximity to a mold cavity prior to its application to the container within the mold cavity.

9. Apparatus according to claim 1, wherein the closed path is provided in the form of a polygon with rounded corners.

* * * * *